United States Patent

[15] 3,673,267

Chen et al.

[45] June 27, 1972

[54] ISOMERIZATION OF CYCLOHEXANE IN THE PRESENCE OF A MORDENITE CATALYST

[72] Inventors: Nai Yuen Chen, Hopewell Township, Mercer County; Fritz A. Smith, Haddonfield, both of N.J.

[73] Assignee: Mobil Oil Corporation

[22] Filed: Oct. 19, 1970

[21] Appl. No.: 81,984

Related U.S. Application Data

[63] Continuation-in-part of Ser. No. 765,031, Oct. 4, 1968, Pat. No. 3,551,353.

[52] U.S. Cl. .......................................... 260/666 P
[51] Int. Cl. .......................................... C07c 13/08
[58] Field of Search.............. 260/683.65, 666 P; 252/455 Z

[56] References Cited

UNITED STATES PATENTS

| | | | |
|---|---|---|---|
| 3,480,539 | 11/1969 | Voorhies, Jr. et al. | 252/455 Z |
| 3,299,153 | 1/1967 | Adams et al. | 260/683.65 |
| 3,507,931 | 4/1970 | Morris et al. | 260/683.65 |
| 3,551,353 | 12/1970 | Nai Yuen Chen et al. | 252/455 Z |

Primary Examiner—Delbert E. Gantz
Assistant Examiner—G. J. Crasanakis
Attorney—Andrew L. Gaboriault, Oswald G. Hayes and Raymond W. Barclay

[57] ABSTRACT

Paraffinic hydrocarbons are isomerized under isomerizing conditions and in the presence of hydrogen with a catalyst of hydrogen mordenite having a silica to alumina mol ratio between about 20:1 and about 60:1, having associated therewith a metal selected from the group consisting of Group IB, Group VIB and Group VIII.

3 Claims, 2 Drawing Figures

3,673,267

ISOMERIZATION OF CYCLOHEXANE IN THE PRESENCE OF A MORDENITE CATALYST

CROSS-REFERENCE TO RELATED APPLICATIONS

This application is a continuation-in-part of U.S. Application Ser. No. 765,031, filed Oct. 4, 1968 which issued as U.S. Pat. No. 3,551,353 on Dec. 29, 1970.

BACKGROUND OF THE INVENTION

This invention relates to the isomerization of paraffinic hydrocarbons. In one of its more specific aspects, the present invention relates to a process for the hydroisomerization of paraffinic, including cycloparaffinic, hydrocarbons in the presence of a crystalline aluminosilicate impregnated with a metallic catalyst. It is particularly concerned with the isomerization of cyclohexane to methyl cyclopentane, with methyl cyclopentane to cyclohexane and with the isomerization of $C_4$ to $C_6$ paraffins in the presence of hydrogen and a metal impregnated mordenite catalyst having a silica to alumina mol ratio greater than about 10:1.

It has heretofore been proposed to isomerize paraffins to equilibrium mixtures of their branch chain isomers with a variety of catalysts, including, by way of example, Friedel Crafts catalysts such as aluminum chloride. Noble metal catalysts such as platinum on suitable supports, such as halogenated alumina or silica/alumina, have also been employed in the isomerization of hydrocarbons. Crystalline aluminosilicate zeolites have more recently been shown to have catalytic activity in the isomerization of hydrocarbons. Among the crystalline aluminosilicate zeolites which have been used for such purpose are zeolite X, zeolite Y and mordenite. In its natural state, mordenite usually appears as the sodium salt represented by the following formula:

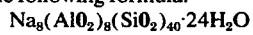

$$Na_8(AlO_2)_8(SiO_2)_{40} \cdot 24H_2O$$

Mordenite's ordered crystalline structure is believed to be made up of chains of five-membered rings of tetrahedra and its adsorbability suggests a parallel system of channels having free diameters on the order of 4 to 6.6A., interconnected by smaller channels, parallel to another axis, on the order of 2.8A. free diameters. As a result of this crystalline framework, mordenite can adsorb simple cyclic hydrocarbons, such as cyclopentane, cyclohexane, benzene and the like, simple branched-chain hydrocarbons, such as 2-methylpentane, as well as straight chain hydrocarbons.

Although mordenite is usually available in its sodium form, it must be 10:1, to the hydrogen form to be an effective catalyst. Hydrogen mordenites used heretofore for effecting isomerization of paraffins have been those wherein the ratio of silica to alumina was approximately 10P1, i.e. substantially the same as in the sodium form of this zeolite.

SUMMARY OF THE INVENTION

It has been found that significant improvements are obtained in a process for isomerizing paraffinic hydrocarbons admixed with hydrogen in the presence of a hydrogen mordenite catalyst if the ratio of silica to alumina in the mordenite i.e. substantially higher than about 10:1. Isomerization of both cycloparaffins such as cyclohexane to methyl cyclopentane and isomerization of light paraffinic hydrocarbons of $C_4$, $C_5$ and $C_6$ paraffins and mixtures thereof has been effectively carried out in the presence of hydrogen and a catalyst of hydrogen mordenite having a silica to alumina mol ratio between about 20:1 and about 60:1, the hydrogen mordenite having associated therewith a metal selected from the group consisting of Groups IB, VIB and VIII.

Hydrocarbon isomers produced by the process of the present invention are useful as feed stocks for hydrocarbon alkylation processes and as gasoline blending stocks because of their high anti-knock properties.

DESCRIPTION OF SPECIFIC EMBODIMENTS

Figure 1:
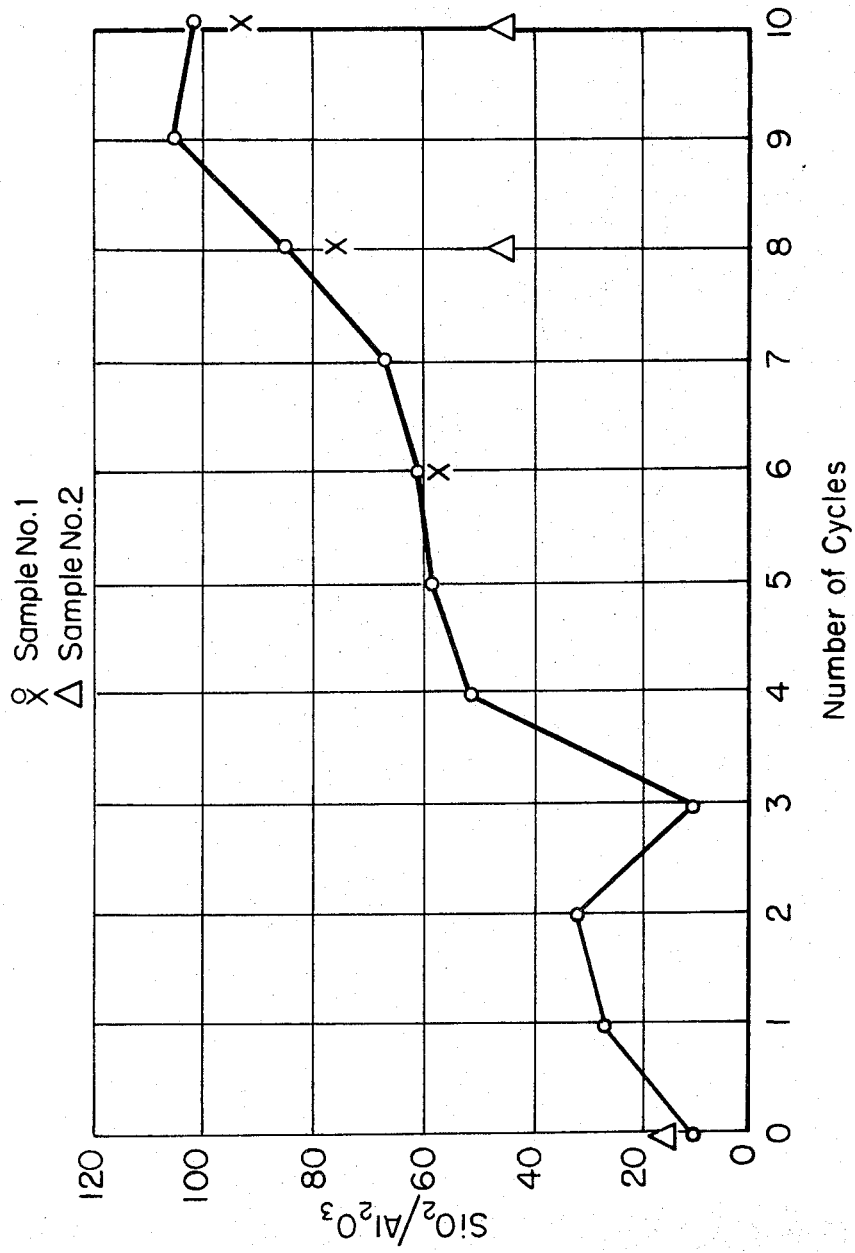

In accordance with the present invention, a hydrocarbon feed stock containing paraffinic hydrocarbons including $C_4$–$C_6$ normal paraffinic hydrocarbons or cycloparaffins, such as cyclohexane, is contacted with a metal impregnated mordenite-type zeolite in hydrogen form having a silica to alumina mol ratio greater than about 10:1 at a temperature effective for conversion of at least part of the hydrocarbon feed stock to branch chain isomers. Since little, if any, improvement has been observed in utilizing a mordenite having exceptionally high silica to alumina ratio, the practical upper limit for the mordenites useful in the present invention are those having silica to alumina mol ratios not exceeding 100:1.

Paraffinic hydrocarbon feed stocks usually employed in the process of the present invention may be a substantially pure normal paraffin having from four to six carbon atoms, mixture of such substantially pure paraffins or a cycloparaffin-containing charge, i.e., cyclohexane. In addition, hydrocarbon fractions rich in $C_4$–$C_6$ normal paraffins or in cyclohexane may also be effectively employed in the process of the invention. For example, contemplated feed stocks include straight run distillates having ASTM distillation end points of about 170° F. containing substantial quantities of $C_4$ to $C_6$ paraffins.

The catalyst used in the present process is a crystalline aluminosilicate known as mordenite. Mordenite in its naturally occuring state is in the sodium form. In such form, mordenite generally has only slight catalytic activity and must, therefore, be converted to the hydrogen form before it finds utility in catalytic processes.

The high ratio of silica to alumina of 10:1 in mordenite permits complete acid exchange to a stable hydrogen form and imparts excellent chemical and thermal stability. The effective pore diameter of hydrogen mordenite prepared by acid treating sodium mordenite and marketed under the trade name Zeolon H appears to be in the range of 8 to 10A. as indicated by absorption of aromatic hydrocarbons. The sodium form of mordenite is not effective for isomerization. However, the hydrogen form of mordenite having a sodium content of less than 5 weight percent is effective for converting paraffinic hydrocarbons to their isomers. Hydrogen mordenite may be produced by ion exchange of the sodium in the mordenite with ammonium ions, followed by heating or calcining to drive off ammonia. A particularly effective method of producing hydrogen mordenite is by acid treatment. In addition to converting the mordenite to its hydrogen form, acid treatment may also remove some of the aluminum from the zeolitic structure thereby increasing the relative proportions of silica to alumina in the zeolite. Hydrogen mordenite generally has a silica to alumina mol ratio of about 10:1 but acid treating sodium mordenite to convert it to its hydrogen form may remove aluminum sufficiently to increase the silica to alumina mol ratio slightly in excess of 10:1. It has been found in accordance with the present invention that a hydrogen mordenite having a silica to alumina mol ratio in the range of 20:1 to 60:1 enhances the catalytic activity of the mordenite employed in hydroisomerization of paraffinic hydrocarbons.

The treatment used to produce the mordenite catalyst employed in the present process must be severe enough to substantially increase the silica to alumina mol ratio of the mordenite in excess of 10:1. However, such treatment must not be so severe as to destroy the crystalline structure of the mordenite. The upper limit in the silica to alumina mol ratio of the hydrogen mordenite component of the catalyst used in the present process would appear to be about 100:1. Preferably, such ratio is between about 20:1 and about 60:1.

Acid leaching may be suitably effected with mineral acids which will effectively remove aluminum without destroying the crystalline structure, for example hydrochloric or sulfuric acid. Boiling diluted hydrochloric acid is highly effective in removing the aluminum. Following such leaching, the mordenite is water washed and calcined, with or without catalytic metal additions, in air at elevated temperatures up to about 1,000° F.

A particularly effective method for preparing high silica/alumina hydrogen mordenites, utilized as catalyst components in the process of the present invention, is by a process involving alternate multiple cycles of steaming and acid extraction. Utilizing such method, mineral acids such as HCl, $H_2SO_4$, $H_3PO_4$ and the like may be employed with particular preference being accorded hydrochloric acid. Alternatively, an organic acid, such as acetic acid, may be used. The concentration of the acid used in the extraction step is between about 0.2 and 10 N and preferably between about 0.5 and 2 N.

Steaming conditions involve the use of temperatures above about 600° F. and preferably above about 1,000° F. at atmospheric pressure. The amount of water present has not been found to be critical so long as there is some water present for hydrolysis to take place. A highly effective procedure has been found to be one consisting of multiple cycles of steaming for 2 hours at 1,000° F. followed by boiling in 2 N HCl for 2 hours.

Crystallinity of mordenite, as indicated by X-ray powder diffraction analysis, has not been found to be substantially decreased by dealuminization. Most dealuminized samples, including those with 90 percent aluminum removed, have crystallinity of 80–95 compared to the starting material which has a crystallinity of 90 (arbitrary scale).

In a preferred method of operation, the hydrocarbon feed stock is passed in the presence of hydrogen into contact with a zeolite of the mordenite type in the hydrogen form having a silica to alumina ratio between about 20:1 and 60:1 under relatively mild hydroconversion reaction conditions. A catalyst metal, suitably a Group IB, Group VIB or a Group VIII metal, particularly a platinum group metal, is preferably associated with the mordenite. The activity of the catalyst is enhanced and its useful life extended by the addition of the metal catalyst, either by impregnation or by ion exchange techniques. Hydrogen is desirably present in that it extends the life of the catalyst and apparently saturates coke precursors which form within the zeolitic structure thereby preventing the formation of polymeric material which would clog the pore openings.

The addition of a metal component to the dealuminized hydrogen mordenite is highly desirable. Group VIII metals, particularly iron, cobalt, nickel, platinum and rhodium, have been found exceptionally useful catalytic additions to hydrogen mordenite having silica to alumina mol ratios of about 10:1 and preferably about 20:1 to about 60:1. Other metals which are desirable components of the catalyst include such Group IB metals as silver and copper and the Group VIB metals, molybdenum, chromium and tungsten. Metals from these three groups may be used alone or in combination. The catalytic material may be incorporated in or on the mordenite base either by ion exchange or impregnation techniques well known in the art.

Hydrogen mordenite having a silica to alumina mol ratio greater than about 10:1 and containing from about 0.1 to 5 percent by weight of a platinum group metal, preferably 0.1 to 2.5 percent of platinum is a particularly effective catalyst for use in the process of the invention. Synthetic mordenite having a silica to alumina ratio between about 20:1 and about 60:1 and having about 0.15 percent by weight of platinum incorporated thereon by impregnation has proved to be a very active and effective catalyst for accomplishing the desired hydroisomerization. Such catalyst is highly resistant to high temperatures permitting regeneration thereof by either oxidation techniques or high temperature hydrogen treatment.

Regeneration of the catalyst by oxidation involves controlled burning of the contaminants from the surface of the catalyst structure with air or a mixture of inert gases with air or oxygen. Regeneration may also be effected by treatment of the catalyst with hydrogen at temperatures generally above the usual conversion reaction temperature.

In general, preferred operating conditions for paraffinic isomerization carried out in accordance with the present process, including the isomerization of $C_4$–$C_6$ paraffins and the isomerization of cycloparaffins such as cyclohexane, in the presence of hydrogen mordenite having a silica to alumina mol ratio greater than about 10:1 and containing an impregnated catalytic metal thereon are: hydrogen gas in the range of 1,000 to 5,000 s.c.f./b, preferably 1,500 to 2,000 s.c.f./b., space velocities in the range of about 0.1 to 20 liquid volumes per hour per volume of catalyst, preferably 1 to 5 LHSV, temperatures in the range of about 400° to 800° F., preferably 450° to 700° F. and pressures within the range of atmospheric to 3,000 psig, preferably in the range of 200 to 800 psig. Temperature conditions particularly preferred for the hydroisomerization of cyclohexane to methyl cyclopentane include those in the range of 550° to 700° F. For hydroisomerization of the $C_4$–$C_6$ normal paraffins, the temperatures is preferably in the approximate range of 600° to 700° F.

The catalyst may be in the form of granules, e.g. 10 to 25 mesh Tyler Standard Screen Scale and preferably is in the form of pellets of extrusions having a diameter of about one-eighth inch. The reaction is suitably carried out over a fixed bed of catalyst with the hydrogen and feed stock passing downwardly through the catalyst bed. Unreacted hydrogen may be separated from the effluent stream from the catalyst bed and recycled to the process.

Operating temperature and catalyst activity are correlated with space velocity to give reasonably rapid processing of the feed stock at catalyst deactivation rates which insure maximum on-stream time of the catalyst between periods of regeneration. On-stream times between periods of regeneration may range from 2 months to 2 years or longer.

As the catalyst ages, its activity for the desired reaction tends to slowly diminish. The catalyst may be maintained at or periodically brought back to approximately its initial level of activity by increasing the operating temperature as the catalyst ages.

The following examples will serve to illustrate the invention without limiting the same:

EXAMPLE 1

Multi-state High Temperature Hydrolysis and Acid Extraction

A. Attainment of High Silica/Alumina Mordenite ($SiO_2/Al_2O_3 > 100$)

Hydrogen mordenite (Sample No. 1) was put through cycles of steaming at 1,000° F. for 2 hours, followed by refluxing in 2 N HCL ($\approx 46$ meq H+/gm) for 4 hours. After nine such cycles, the silica to alumina mol ratio was greater than 100:1. The weight percent alumina was reduced from 13.4 percent to 1.6 percent corresponding to 89 percent removal of the alumina in the starting material. However, during the first three cycles, the silica to alumina ratio rose first to 32 and then fell to 11, indicating simultaneous loss of both alumina and silica. The change of $SiO_2/Al_2O_3$ as a function of the number of steam and acid cycles is shown in FIG. 1.

B. Reproducibility

The same method was repeated on both samples of the same lot (Sample No. 1) and of a different lot (Sample No. 2). Results are also shown in FIG. 1. Reproducibility on the same lot was fairly well established, but results on different lots indicate structural differences between synthetic mordenite samples. The $SiO_2/Al_2O_3$ ratio of Sample No. 2 was no higher than 47 (corresponding to 69% Al removal) after 10 cycles.

EXAMPLE 2

Ion exchanged dealuminized mordenite, (made from Sample No. 2) having a $SiO_2/Al_2O_3 = 32$ mol ratio, was treated with a 0.2 N NaCl solution containing a trace amount of Pt $(NH_3)_4CL_2$ to yield a final catalyst containing 0.15 weight percent Pt. The catalyst contained 1.8% Na ($\approx 80$ percent cationic sites), sorbed 6.5 weight percent cyclohexane and had an alpha rating of 300–900.

N-hexane was hydroisomerized over the above catalyst at 600°–650° F. and 300 psig to give the following yields:

Hydroisomerization of n-Hexane over Pt-Dealuminized Mordenite

| Temperature, °F. | 600 | 650 |
|---|---|---|
| LHSV | 1.2 | 2.4 |
| $H_2$/Charge, mol/mol | 35 | 26 |
| Yield, Wt. % | | |
| $C_5$ | 5 | 7 |
| iso $C_6$'s | 51 | 62 |
| $nC_6$ | 45 | 31 |
| Conversion (1) | 68 | 83 |
| Selectivity (2) | 93% | 92% |

(1) Conversion = 100 minus n-hexane above equilibrium amount
(2) Selectivity = 1 -

Comparison of the composition of the $C_6$ isomers with that of the equilibrium mixture shown in the table below indicates that 2,2 dimethylbutane yield is significantly lower than predicted, particularly at 600° F.

| Temperature, °F | 600 | | 650 | |
|---|---|---|---|---|
| | Actual | Theoretical | Actual | Theoretical |
| n-Hexane | 19 (3) | 19 | 20 (3) | 20 |
| 2-Methylpentane + 2,3 dimethylbutane | 48 | 41 | 44 | 41 |
| 3 Methylpentane | 27 | 22 | 26 | 23 |
| 2,2 Dimethylbutane | 6 | 18 | 10 | 16 |

(3) n-Hexane assumed at equilibrium

EXAMPLES 3-10

Figure 2:
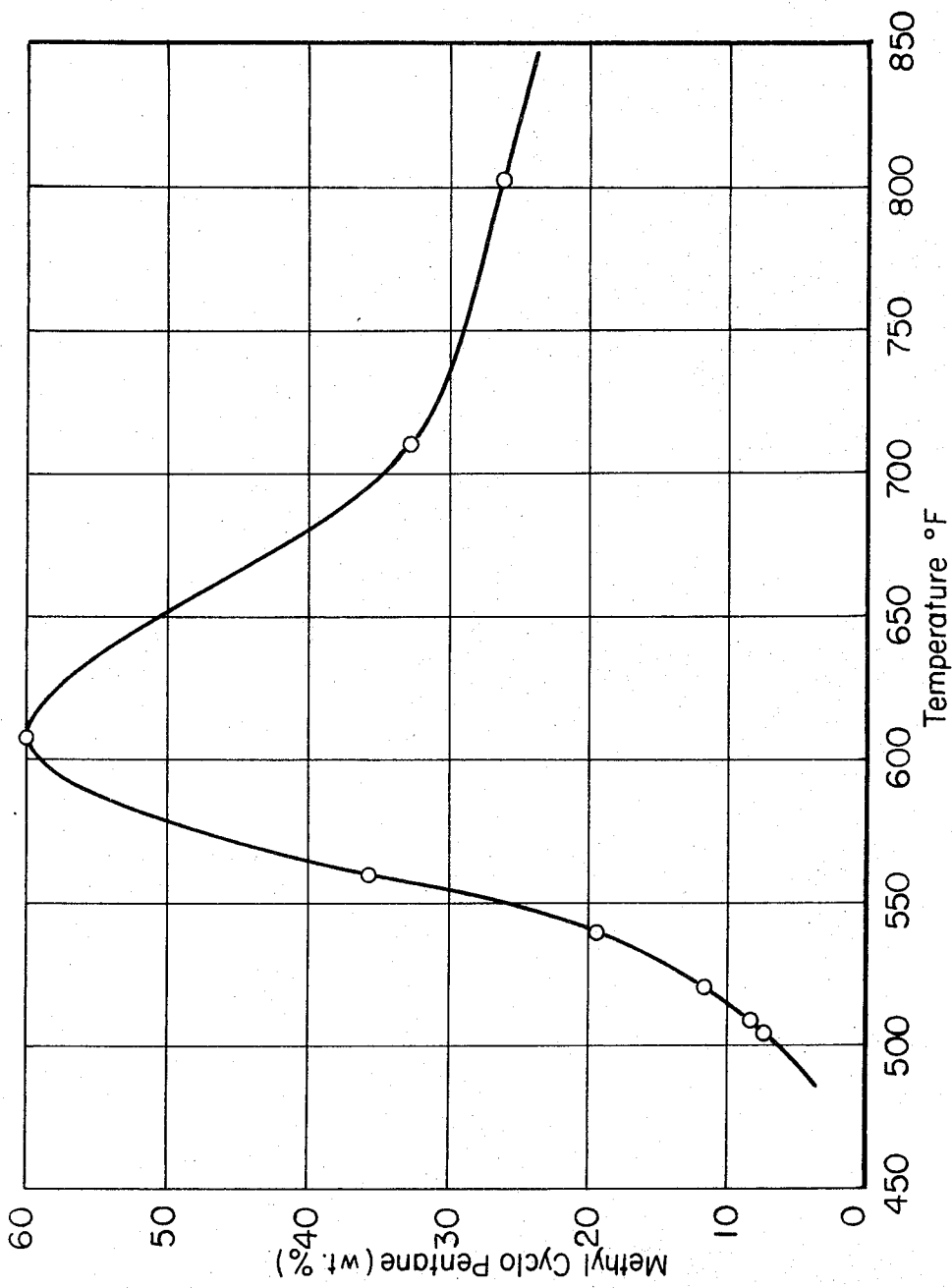

Cyclohexane was converted to methylcyclopentane over the catalyst described in Example 2 at temperatures between about 500° F. and 800° F. It was observed that maximum yields of methylcyclopentane were achieved at a temperature in the range of 550° to 700° F. under the conditions at which the runs were carried out, as will be evident from the results shown graphically in FIG. 2 wherein yield of methylcyclopentane is plotted against reaction temperature. The conditions and results of these examples, in which about 1 gram of the catalyst was employed in each instance, are set forth in the following table.

| Example | 3 | 4 | 5 | 6 | 7 | 8 | 9 | 10 |
|---|---|---|---|---|---|---|---|---|
| Temp., °F | 710 | 608 | 509 | 560 | 804 | 521 | 505 | 540 |
| Inlet pressure, p.s.i.g. | 350 | 315 | 309 | 312 | 348 | 318 | 318 | 322 |
| Inlet pressure, p.s.i.g. | 280 | 290 | 290 | 290 | 290 | 300 | 300 | 300 |
| $H_2$ flow, cc./min | 375 | 320 | 320 | 320 | 360 | 320 | 320 | 320 |
| Oil flow, cc./hr | 12 | 4 | 4 | 4 | 4 | 4 | 4 | 4 |
| Chromatographic results, wt. percent: | | | | | | | | |
| Dry gas | 6.25 | 1.4 | | | 11.3 | | | |
| Butanes | 4.80 | | | | 28.3 | | | |
| Pentanes | 2.07 | | | | 10.4 | | | |
| Methylcyclopentane | 32.39 | 60.1 | 8.4 | 35.6 | 26.1 | 11.3 | 7.4 | 19.7 |
| Cyclohexane | 51.78 | 38.5 | 91.6 | 64.4 | 5.1 | 88.7 | 92.6 | 80.3 |
| N-hexane | 0.94 | | | | 6.4 | | | |
| 2-methylpentane +2,3-dimethylbutane | 1.25 | | | | 7.4 | | | |
| 3-methylpentane | 0.52 | | | | 3.8 | | | |
| 2,2-dimethylbutane | | | | | 1.4 | | | |

EXAMPLES 11-14

Normal hexane was hydroisomerized over the catalyst described in Example 2 at temperatures in the approximate range of 600° to 675° F. and 300 psig. The conditions and results of these examples, in which about 1 gram of the catalyst was employed in each instance, are shown in the table below:

| Example | 11 | 12 | 13 | 14 |
|---|---|---|---|---|
| Temp. °F. | 676 | 650 | 625 | 600 |
| Inlet Pressure, psig | 324 | 328 | 328 | 312 |
| Outlet Pressure, psig | 300 | 300 | 300 | 300 |
| $H_2$ Flow, cc/min | 320 | 320 | 320 | 320 |
| Oil Flow, cc/hr | 4 | 4 | 4 | 4 |
| Chromatographic Results, Wt. % | | | | |
| Dry Gas | 10.3 | 4.8 | 3.0 | 2.5 |
| Butanes | 2.8 | 1.5 | 1.2 | 1.3 |
| Pentanes | 1.8 | 1.2 | 0.7 | 0.7 |
| N-hexane | 20.9 | 28.3 | 37.2 | 41.7 |
| 2-Methylpentane + 2,3-Dimethylbutane | 35.0 | 36.7 | b 33.8 | 32.2 |
| 3-Methylpentane | 20.6 | 20.8 | 19.6 | 17.9 |
| 2,2-Dimethylbutane | 8.5 | 6.7 | 4.6 | 3.7 |

It is to be understood that the foregoing disclosure is merely illustrative of preferred embodiments of the invention of which many variations may be made by those skilled in the art within the scope of the following claims without departing from the spirit thereof.

We claim:

1. A process for isomerizing cyclohexane to methyl cyclopentane which comprises contacting a hydrocarbon stream comprising a substantial portion of cyclohexane under isomerizing conditions and in the presence of hydrogen with a catalyst consisting of hydrogen mordenite and a metal selected from the group consisting of Group IB, VIB and VIII of the Periodic Table, said mordenite having a silica to alumina mol ratio between about 20:1 and about 60:1, said metal being associated with said mordenite and comprising 0.1 to 5 weight percent of said catalyst.

2. A process according to claim 1 wherein said isomerizing conditions include a temperature in the approximate range of 550° to 700° F.

3. A process according to claim 1 wherein the metal is selected from the group consisting of iron, cobalt, nickel, platinum and rhodium.

* * * * *

PO-1050
(5/69)

UNITED STATES PATENT OFFICE
CERTIFICATE OF CORRECTION

Patent No. 3,673,267                    Dated June 27, 1972

Inventor(s) Nai Yuen Chen and Fritz A. Smith

It is certified that error appears in the above-identified patent and that said Letters Patent are hereby corrected as shown below:

| | |
|---|---|
| Column 1, line 50 | Delete "10:1," and after the first "be" insert --converted-- |
| Column 1, line 54 | "10P1" should read --10:1-- |
| Column 1, line 61 | "i.e." should read --is-- |
| Column 3, line 46 | "about 10:1" should read --above 10:1-- |
| Column 4, line 14 | "temperatures" should be --temperature-- |
| Column 5, line 13 | After "1-" insert $--\dfrac{C_6}{Conv.}--$ |
| Column 5, line 45 | "Inlet" should be --Outlet-- |
| Column 6, line 27 | After "36.7" delete --b-- |

Signed and sealed this 26th day of December 1972.

(SEAL)
Attest:

EDWARD M. FLETCHER, JR.
Attesting Officer

ROBERT GOTTSCHALK
Commissioner of Patents